United States Patent
Furuya

(10) Patent No.: US 8,229,447 B2
(45) Date of Patent: Jul. 24, 2012

(54) UPLINK TRANSMIT POWER CONTROL METHOD, COMMUNICATION TERMINAL UNIT, BASE STATION UNIT, AND MOBILE COMMUNICATION SYSTEM

(75) Inventor: Takehiro Furuya, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 68 days.

(21) Appl. No.: 12/792,431

(22) Filed: Jun. 2, 2010

(65) Prior Publication Data

US 2010/0304753 A1    Dec. 2, 2010

Related U.S. Application Data

(63) Continuation of application No. PCT/JP2007/073341, filed on Dec. 3, 2007.

(51) Int. Cl.
*H04W 72/00* (2009.01)

(52) U.S. Cl. ........................ 455/450

(58) Field of Classification Search ............ 455/450
See application file for complete search history.

(56) References Cited

U.S. PATENT DOCUMENTS

| | | | |
|---|---|---|---|
| 6,044,067 A | 3/2000 | Suzuki | |
| 6,119,018 A | 9/2000 | Kondo | |
| 6,128,486 A * | 10/2000 | Keskitalo et al. | 455/422.1 |
| 6,606,496 B1 * | 8/2003 | Salvarani et al. | 455/436 |
| 7,650,115 B2 * | 1/2010 | Caldwell et al. | 455/63.1 |
| 2005/0105483 A1 | 5/2005 | Uehara et al. | |
| 2005/0254555 A1 * | 11/2005 | Teague | 375/136 |
| 2006/0083161 A1 * | 4/2006 | Laroia et al. | 370/208 |
| 2006/0183496 A1 | 8/2006 | Muraoka | |
| 2007/0087694 A1 * | 4/2007 | Jin et al. | 455/63.1 |
| 2007/0270100 A1 * | 11/2007 | Agrawal et al. | 455/67.11 |
| 2008/0075037 A1 * | 3/2008 | Guo et al. | 370/329 |
| 2009/0022178 A1 * | 1/2009 | Ji et al. | 370/470 |
| 2009/0131065 A1 * | 5/2009 | Khandekar et al. | 455/452.1 |
| 2011/0136496 A1 * | 6/2011 | Klang et al. | 455/452.1 |

FOREIGN PATENT DOCUMENTS

| | | |
|---|---|---|
| JP | 10-65604 | 3/1998 |
| JP | 2830911 | 9/1998 |
| JP | 2003244069 | 8/2003 |
| JP | 2004187247 | 7/2004 |
| JP | 2006060848 | 3/2006 |
| JP | 2006222849 | 8/2006 |

OTHER PUBLICATIONS

International Search Report dated Jan. 15, 2008 in corresponding International application No. PCT/JP2007/073341.
Japanese Office Action mailed Apr. 24, 2012 for corresponding Japanese Application No. 2009-544513, with English-language translation.

* cited by examiner

*Primary Examiner* — Nathan Mitchell
(74) *Attorney, Agent, or Firm* — Fujitsu Patent Center

(57) ABSTRACT

In a mobile communication system in which a modulation and coding scheme is selected in accordance with reception quality information in which a terminal periodically reports to a base station, a method for causing a terminal located near the boundary of a cell to reduce its uplink transmit power by considering intercell interference and without incurring an increase in error rate. The method includes the steps of: a first base station detecting an interference level and terminal identification information identifying an interfering terminal, and transmitting interference information to all neighboring base stations; a second base station unit, as the serving base station of the terminal, receiving the interference information and transmitting control information to the terminal; and the terminal receiving the control information, reducing transmit power in accordance with the interference level, and adjusting reception quality information in such a direction so as to reduce quality.

3 Claims, 13 Drawing Sheets

FIG.1

| CQI | MCS |
|---|---|
| 1 | 1 |
| 2 | 2 |
| 3 | 3 |
| 4 | 4 |
| 5-30 | 5 |

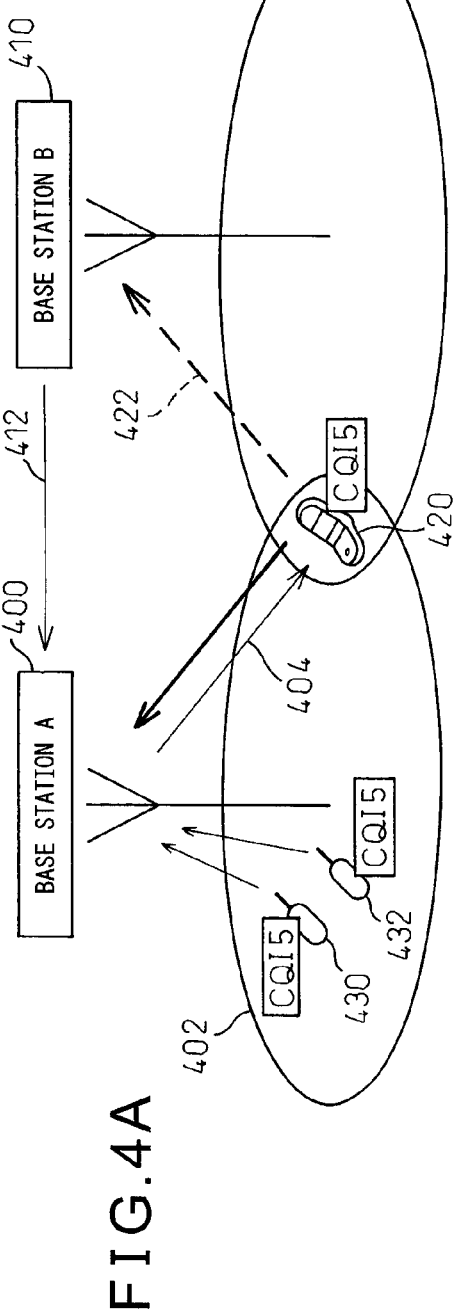
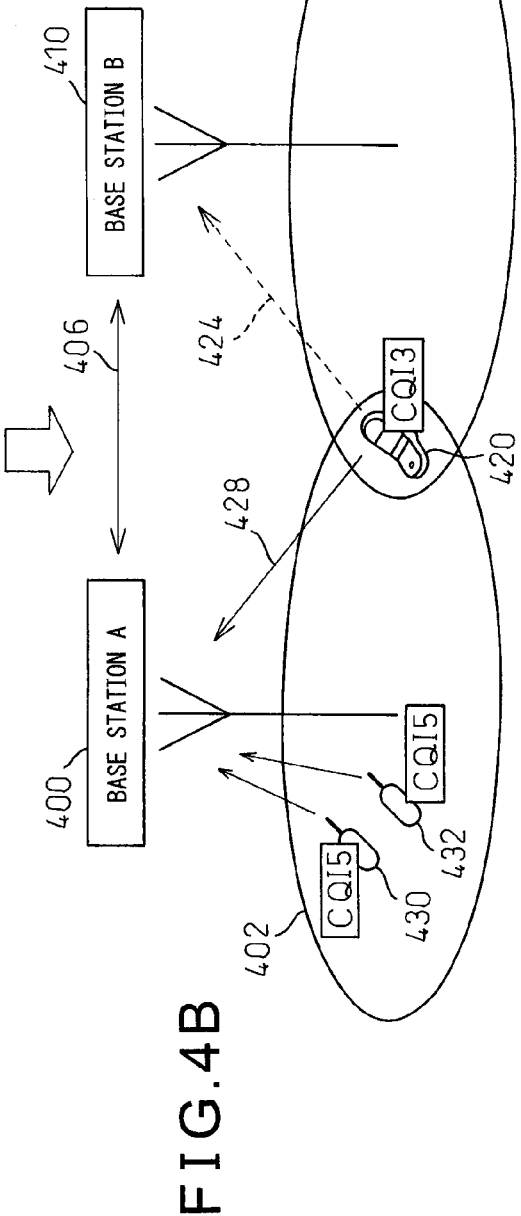
FIG.4A
FIG.4B

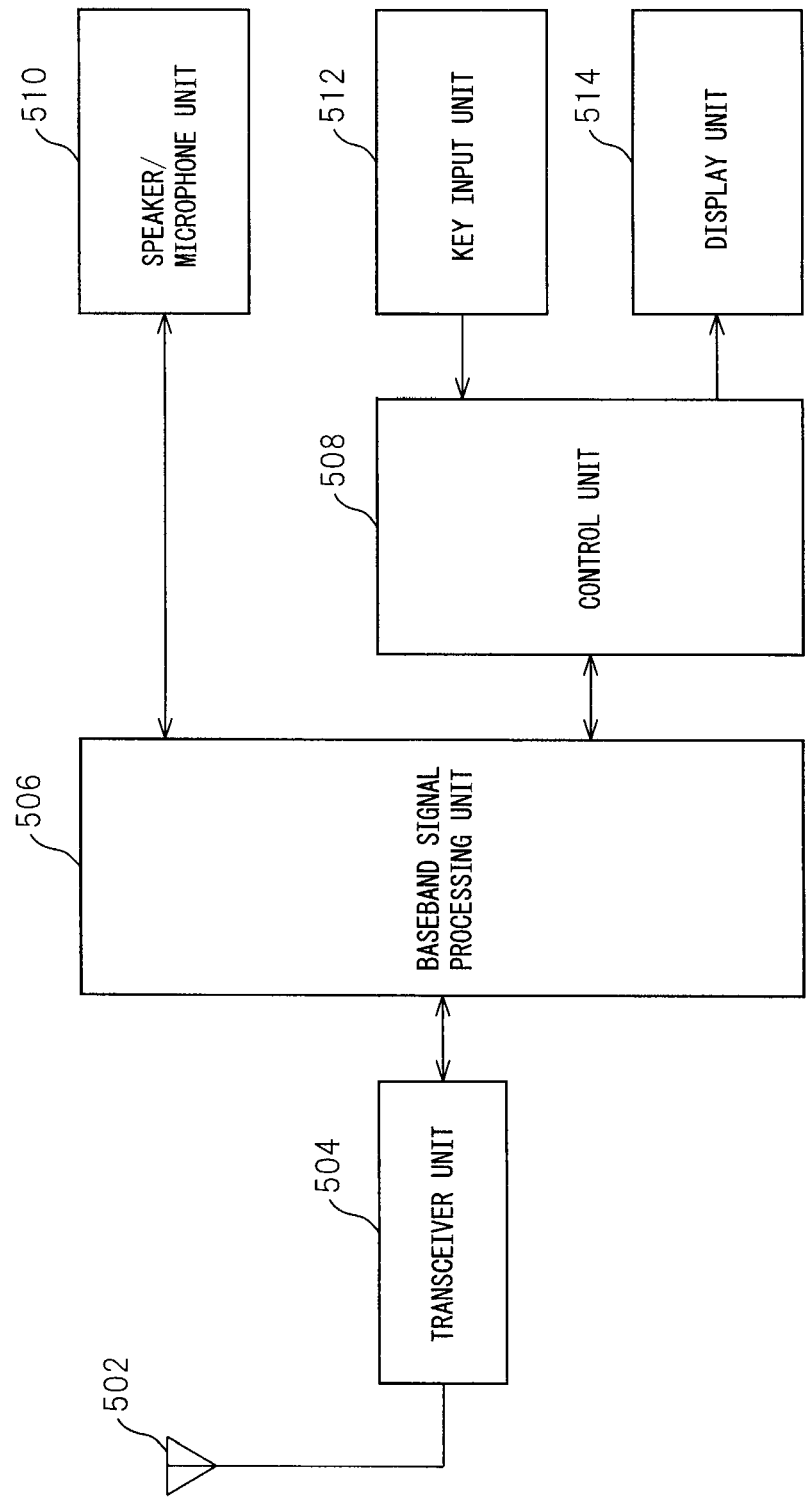

UPLINK TRANSMIT POWER CONTROL METHOD, COMMUNICATION TERMINAL UNIT, BASE STATION UNIT, AND MOBILE COMMUNICATION SYSTEM

CROSS-REFERENCE TO RELATED APPLICATIONS

This application is a continuation of PCT/JP2007/073341, filed on Dec. 3, 2007, the contents of which are incorporated herein by reference.

TECHNICAL FIELD

The present invention relates to an uplink transmit power control method for mobile communications and also to a communication terminal unit (mobile station unit), a base station unit, and a mobile communication system for implementing the method.

BACKGROUND ART

In a mobile telephone system, uplink transmit power control is performed that controls the power of transmission from a mobile telephone as a mobile terminal unit (hereinafter sometimes referred to simply as the "terminal") to a base station unit (hereinafter referred to simply as the "base station") in order to reduce interference and to provide consistent communication quality. More specifically, the base station measures the signal-to-interference power ratio from the signal received from the terminal, and if the measured value is greater than a target value, the base station transmits a command instructing the terminal to reduce the transmit power; conversely, if it is lower, the base station transmits a command instructing the terminal to raise the transmit power. The terminal controls its transmit power by receiving such a command (refer, for example, to patent documents 1 to 4 cited below).

On the other hand, recent years have seen the implementation of a high-speed packet communication standard called HSDPA (High Speed Downlink Packet Access) as a new technology for mobile telephone data communications. With this technology, the modulation and coding scheme (MCS) is dynamically changed in accordance with the radiowave environment of the transmission channel. More specifically, the terminal measures the reception quality of the pilot channel and reports CQI (Channel Quality Indicator), an index corresponding to the reception quality, to the base station at periodic intervals of time. The appropriate modulation scheme and coding rate are selected based on the CQI value.

In HSDPA, two schemes, 16-QAM (Quadrature Amplitude Modulation) and QPSK (Quadriphase Phase Shift Keying), are provided as modulation schemes. While 16-QAM can transmit data at twice the speed of QPSK, it is more susceptible to errors caused by external disturbances. The coding rate is the ratio of the number of information bits to the number of bits after error correction coding, and a coding rate of 8/9, for example, means that eight bits of information become nine bits after error correction coding. Accordingly, as the coding rate becomes larger, the transmission speed becomes higher, but the error correction capability degrades.

Further, an uplink transmit power control method that considers intercell interference is currently under study; in this method, each base station measures received signal power, exchanges interference information with other base stations, and transmits by means of a downlink transmit signal a control signal instructing a terminal located near the boundary of the serving cell to reduce its uplink transmit power.

However, in the HSDPA described above, the transmission speed is determined based on the CQI value. If the uplink transmit power is reduced by the uplink transmit power control based on intercell interference while the transmission speed is maintained constant, the noise level increases, and the error rate correspondingly increases. If the error rate becomes too high, not only the data channel but also the control channel generates an error; when this happens, the base station is unable to correctly demodulate the signal received from the terminal and, in some cases, even becomes unable to recognize the terminal. This increases the possibility that the terminal located near the boundary of the serving cell will in effect be treated as being "out of range."

Patent document 1: Japanese Unexamined Patent Publication No. 2006-060848
Patent document 2: Japanese Unexamined Patent Publication No. 2003-244069
Patent document 3: Japanese Unexamined Patent Publication No. 2006-222849
Patent document 4: Japanese Patent No. 2830911

DISCLOSURE OF THE INVENTION

Problems to Be Solved by the Invention

The present invention has been devised in view of the above problem, and an object of the invention is to provide, for use in a mobile communication system in which the modulation and coding scheme is selected in accordance with reception quality information that a communication terminal unit as a mobile station unit periodically reports to a base station unit, an uplink transmit power control method that can cause a communication terminal located near the boundary of a cell to reduce its uplink transmit power by considering intercell interference and without incurring an increase in error rate.

Means for Solving the Problem

To achieve the above object, according to one aspect of the invention, there is provided an uplink transmit power control method for use in a mobile communication system in which a modulation and coding scheme is selected in accordance with reception quality information that a communication terminal unit as a mobile station unit periodically reports to a base station unit, the method comprising the steps of: a first base station unit detecting an interference level and terminal identification information identifying a communication terminal unit that is causing interference greater than a predetermined reference value to the first base station unit; the first base station unit transmitting the interference level and the terminal identification information together as interference information to all neighboring base stations; a second base station unit receiving the interference information and recognizing, based on the terminal identification information, that the communication terminal unit is currently under the control of the second base station unit; the second base station unit transmitting, to the communication terminal unit, control information indicating the interference level and also indicating that the communication terminal unit is causing interference; the communication terminal unit receiving the control information; and the communication terminal unit reducing transmit power in accordance with the interference level indicated by the control information, and adjusting reception quality information in such a direction as to reduce quality.

According to another aspect of the invention, there is provided an uplink transmit power control method for use in a mobile communication system in which a modulation and coding scheme is selected in accordance with reception quality information that a communication terminal unit as a mobile station unit periodically reports to a base station unit, the method comprising the steps of: a first base station unit detecting an interference level and terminal identification information identifying a communication terminal unit that is causing interference greater than a predetermined reference value to the first base station unit; the first base station unit transmitting, to the communication terminal unit, control information indicating the interference level and also indicating that the communication terminal unit is causing interference; the communication terminal unit receiving the control information; the communication terminal unit reducing transmit power in accordance with the interference level indicated by the control information, and adjusting reception quality information in such a direction as to reduce quality; and the first base station unit transmitting to all neighboring base stations notification information notifying that the control information has been transmitted to the communication terminal unit.

In one preferred mode, the method further comprises the steps of: the first base station unit detecting that the communication terminal unit is again causing interference greater than the predetermined reference value to the first base station unit; and the first base station unit placing the communication terminal unit under the control of the first base station unit in response to the detection of the interference.

Further, according to the present invention, a communication terminal unit, a base station unit, and a mobile communication system that are directly used for implementing the above method are provided.

Effect of the Invention

According to the uplink transmit power control method described above, when intercell interference is detected, the uplink transmit power is reduced, and at the same time, the reception quality information is adjusted in such a direction as to reduce the quality; as a result, intercell interference can be prevented without incurring an increase in error rate.

BRIEF DESCRIPTION OF THE DRAWINGS

FIG. 1 is a diagram depicting a table that defines a modulation and coding scheme MCS in accordance with reception quality information CQI.

FIGS. 4A-4B are diagrams explaining a mobile communication system and an uplink transmit power control method according to a first embodiment of the present invention.

FIG. 5 is a diagram depicting in simplified form the configuration of a mobile telephone.

Figures 2A, 2B:
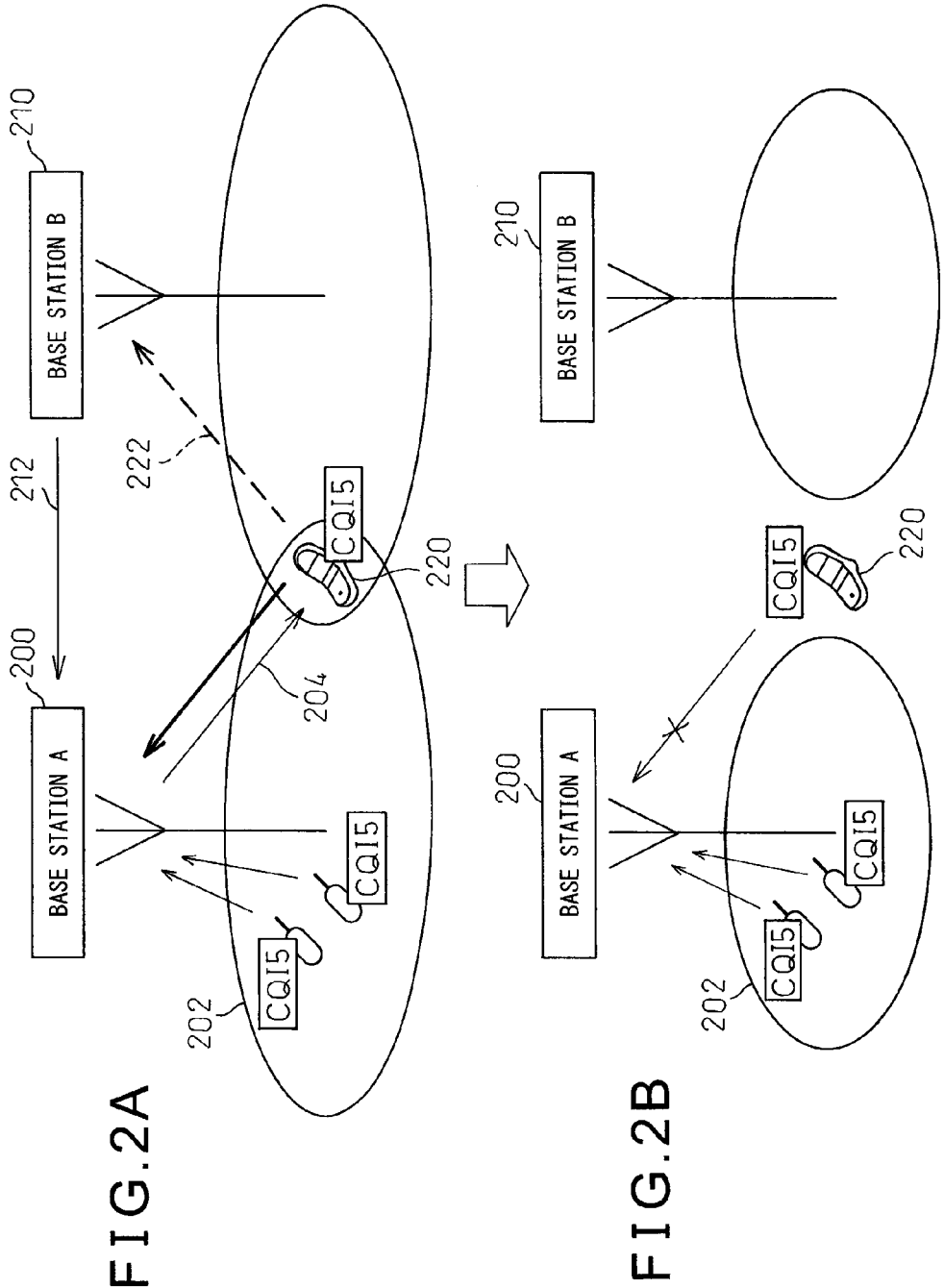
FIGS. 2A-2B are diagrams explaining an uplink transmit power control method that considers intercell interference and a problem associated with the method.

DESCRIPTION OF REFERENCE NUMERALS 200, 400, 1000, 1200 . . . BASE STATION UNIT A
210, 410, 1010, 1210 . . . BASE STATION UNIT B
220, 420, 1020, 1220 . . . COMMUNICATION TERMINAL UNIT
502 . . . ANTENNA
504 . . . TRANSCEIVER UNIT
506 . . . BASEBAND SIGNAL PROCESSING UNIT
508 . . . CONTROL UNIT
510 . . . SPEAKER/MICROPHONE UNIT
512 . . . KEY INPUT UNIT
514 . . . DISPLAY UNIT
602 . . . ANTENNA
604 . . . TRANSCEIVER UNIT
606 . . . BASEBAND SIGNAL PROCESSING UNIT
608 . . . TRANSMISSION LINE INTERFACE UNIT
610 . . . CONTROL UNIT

BEST MODE FOR CARRYING OUT THE INVENTION

Figure 1:
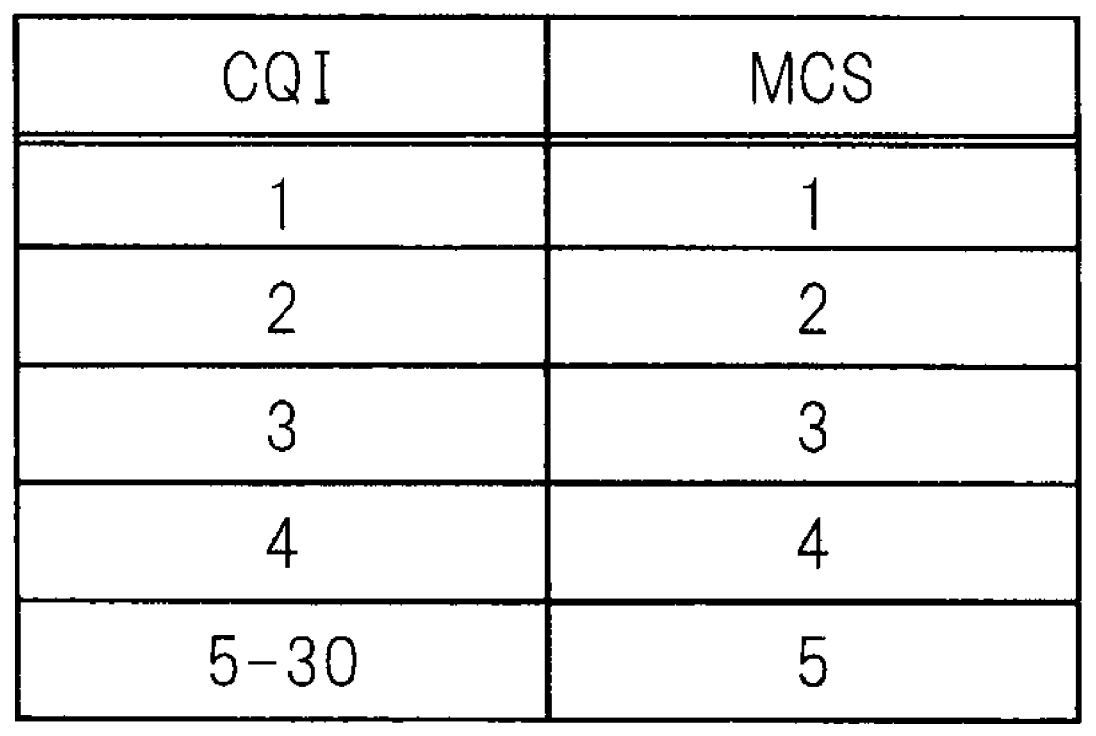

First, intercell interference in a mobile communication system in which the modulation and coding scheme MCS is selected in accordance with reception quality information CQI that a terminal periodically reports to a base station, uplink transmit power control as a related technology that considers the interference, and the problem associated with the control will be described below with reference to FIGS. 1, 2, and 3. It is assumed that the table depicted in FIG. 1 is provided as a CQI table that defines the modulation and coding scheme MCS in accordance with the reception quality information CQI. This table maps CQI indexes "1" to "30" to MCS indexes "1" to "5".

Suppose that, as depicted in FIG. 2A, a terminal 220 located in the cell 202 of a base station A (reference numeral 200) moves to the boundary of the cell 202 and begins to cause interference to a neighboring base station B (reference numeral 210) as indicated by arrow 222. Since the terminal 220 currently served by the base station A is causing interference to the base station B, the base station B sends a notification as indicated by arrow 212 to its neighboring base stations, including the base station A, to the effect that the terminal 220 is causing interference.

In response to the notification, the base station A as the serving base station of the terminal 220 notifies the terminal 220 to reduce its uplink transmit power, as indicated by arrow 204. In this case, if the current CQI value of the terminal 220 is "5", for example, the transmit power is reduced while maintaining the modulation and coding scheme MCS index "5" corresponding to the CQI value "5".

Figure 3:
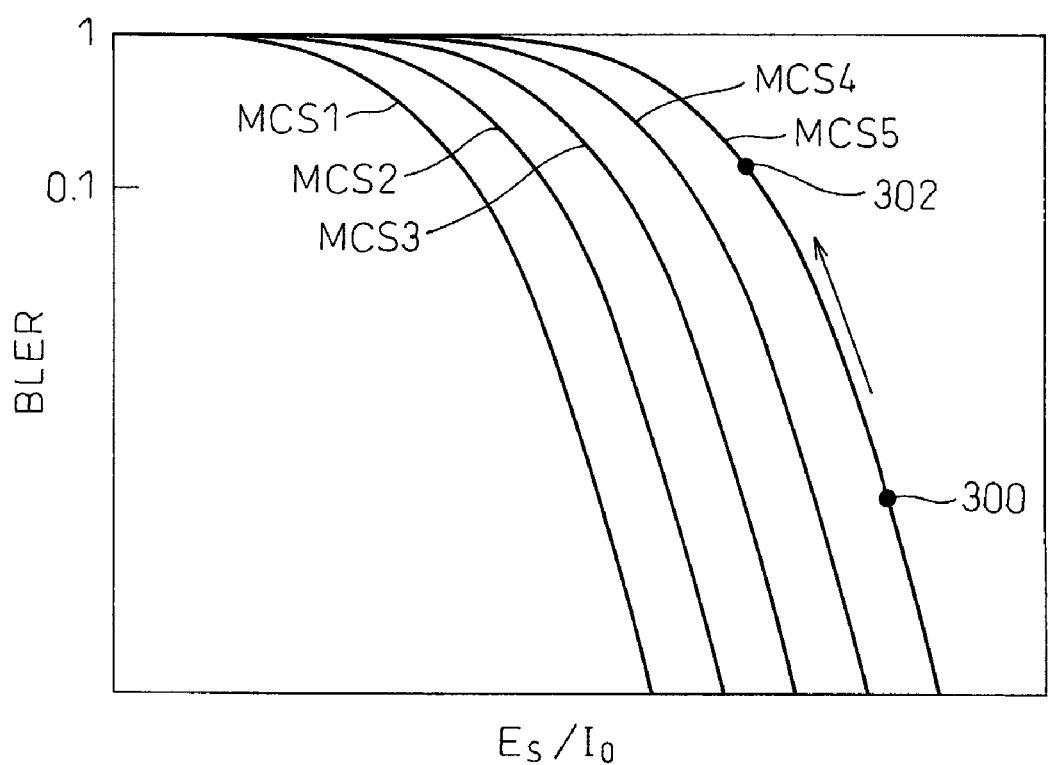
FIG. 3 is a diagram depicting the relationship between the block error rate BLER and the symbol power to interference power ratio $E_S/I_0$, with the modulation and coding scheme MCS as a parameter.

It is assumed here that the relationship between the block error rate BLER and the symbol power to interference power ratio $E_S/I_0$ is defined as depicted in FIG. 3 with the modulation and coding scheme MCS as a parameter. As the transmit power is reduced, the operating point of the terminal 220 moves from the operating point indicated at 300 in FIG. 3 to the operating point indicated at 302. That is, the block error rate BLER increases. As previously described, this increases the possibility that the terminal 220 will in effect be treated as being "out of range," as depicted in FIG. 2B.

Embodiments of the present invention that address the above problem will be described below. FIG. 4 is a diagram explaining a mobile communication system and an uplink transmit power control method according to a first embodiment of the present invention. In the figure, reference numeral 400 is a base station A, 410 is a base station B, and 420, 430, and 432 are mobile telephones as communication terminal units each constituting a mobile station unit.

FIG. 5 illustrates in simplified form the configuration of each mobile telephone. In the figure, reference numeral 502 is an antenna, 504 is a transceiver unit, 506 is a baseband signal processing unit, 508 is a control unit, 510 is a speaker/microphone unit, 512 is a key input unit, and 514 is a display unit. The baseband signal processing unit 506 performs such processing as modulation, demodulation, radio communication control, voice processing, image processing, and multimedia interface processing. The control unit 508 performs such processing as communication protocol processing and application processing.

Figure 6:
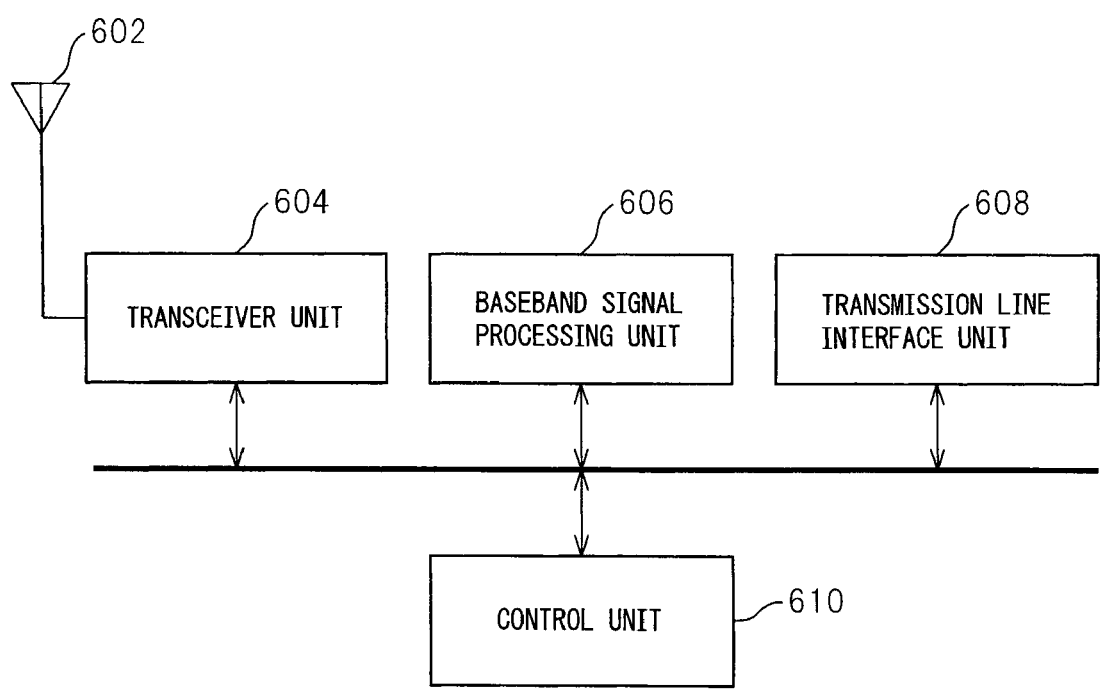
FIG. 6 is a diagram depicting in simplified form the configuration of a base station unit.

FIG. 6 illustrates in simplified form the configuration of each base station. In the figure, reference numeral 602 is an antenna, 604 is a transceiver unit which amplifies transmit/receive signals, 606 is a baseband signal processing unit which performs such processing as modulation, demodulation, and radio communication control, 608 is a transmission line interface unit as an interface to a wired transmission line, and 610 is a control unit which controls the entire operation of the base station.

Figure 7:
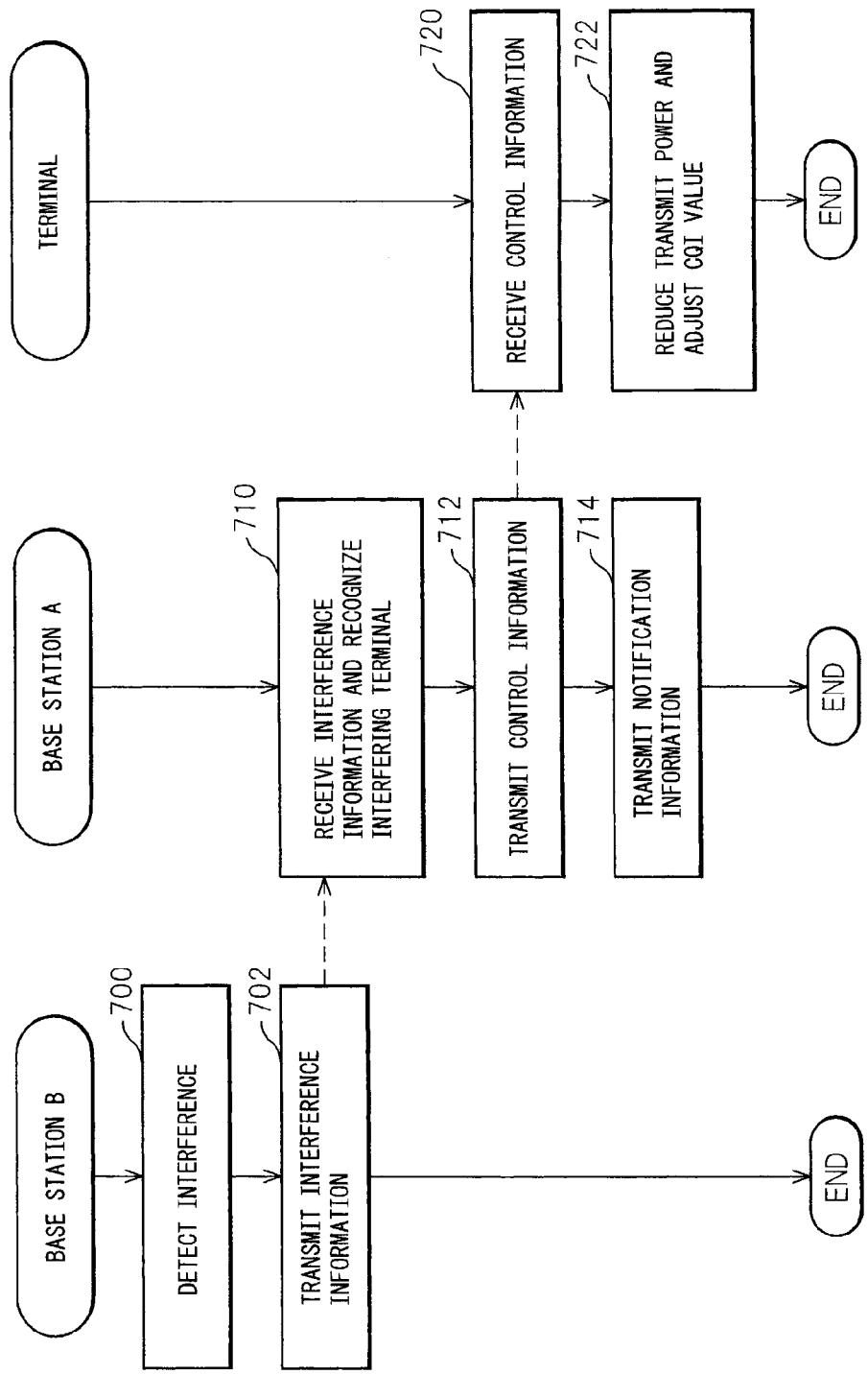
FIG. 7 is a sequence diagram illustrating the operation of base station A, base station B, and terminal according to the first embodiment.
Figure 8:
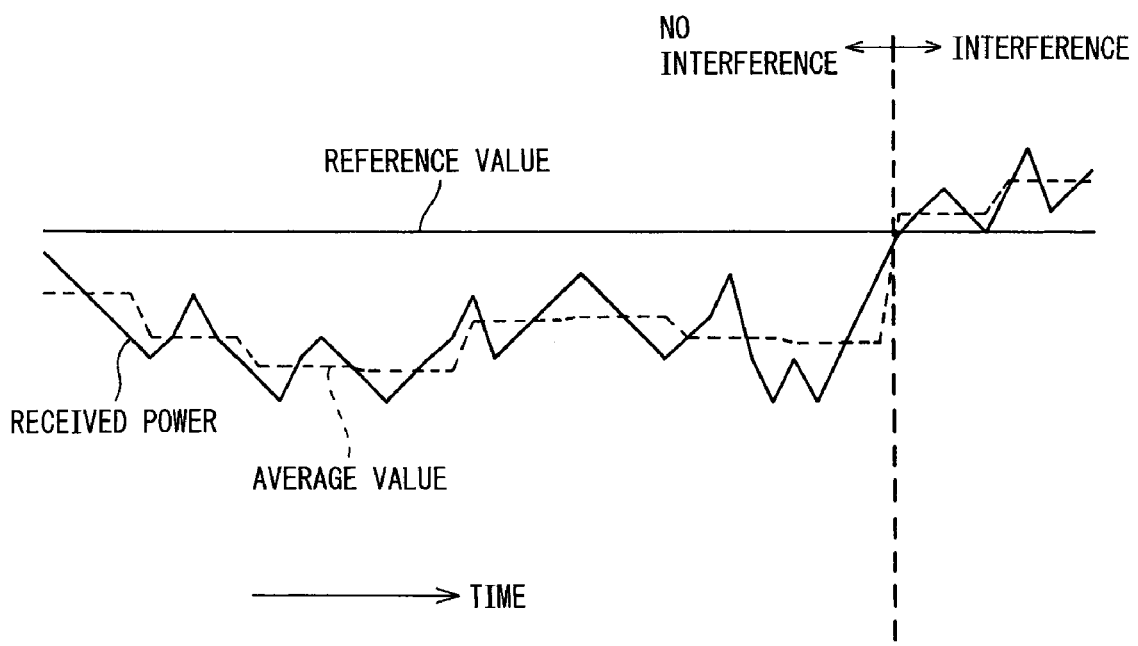
FIG. 8 is a diagram explaining the detection of interference.

FIG. 7 is a sequence diagram illustrating the operation of the base station A (reference numeral 400), base station B (reference numeral 410), and terminal 420 according to the first embodiment. The uplink transmit power control according to the first embodiment will be described with reference to FIGS. 4 and 7. As depicted in FIG. 4A, when the terminal 420 located in the cell 402 of the base station A moves to the boundary of the cell 402 and begins to cause interference to the neighboring base station B as indicated by arrow 422, the base station B detects the interference (step 700). To detect such interference, the base station measures the received power from each terminal, and if the average value of the received power from a terminal not being served by the base station exceeds a predetermined reference value, as depicted in FIG. 8, the base station determines the situation as being the occurrence of interference.

Next, as indicated by arrow 412 in FIG. 4A, the base station B transmits the interference level and the identification information (ID) of the terminal 420 together as interference information to all the neighboring base stations including the base station A (step 702). The interference level is calculated, for example, as "average value of received power—reference value."

The base station A that received the interference information recognizes that the terminal identification information indicates the terminal 420 currently served by the base station A (step 710). Next, the base station A transmits control information to the terminal 420, as indicated by arrow 404 in FIG. 4A (step 712). This control information carries an interference flag indicating the occurrence of interference and the interference level reported from the base station B. The control information is transmitted on a control channel or data channel to the terminal 420, or transmitted as an independent signal.

The terminal 420 receives the control information from the base station A (step 720). From the interference flag, the terminal 420 recognizes that it is causing interference, and reduces its transmit power in accordance with the interference level contained in the control signal, while at the same time, adjusting the CQI value in such a direction as to reduce the quality (step 722). Further, the base station A transmits notification information to all the neighboring base stations, including the base station B, to notify that the control information has been transmitted to the terminal 420 (step 714), and the information concerning the terminal 420 is shared with the base station B, as indicated by arrow 406 in FIG. 4B.

In the example depicted in FIGS. 4A and 4B, the terminal 420 is controlled so as to reduce the CQI value from "5" to "3". Then, the modulation and coding scheme MCS index is also changed from "5" to "3", as defined in the CQI table depicted in FIG. 1.

Figure 9:
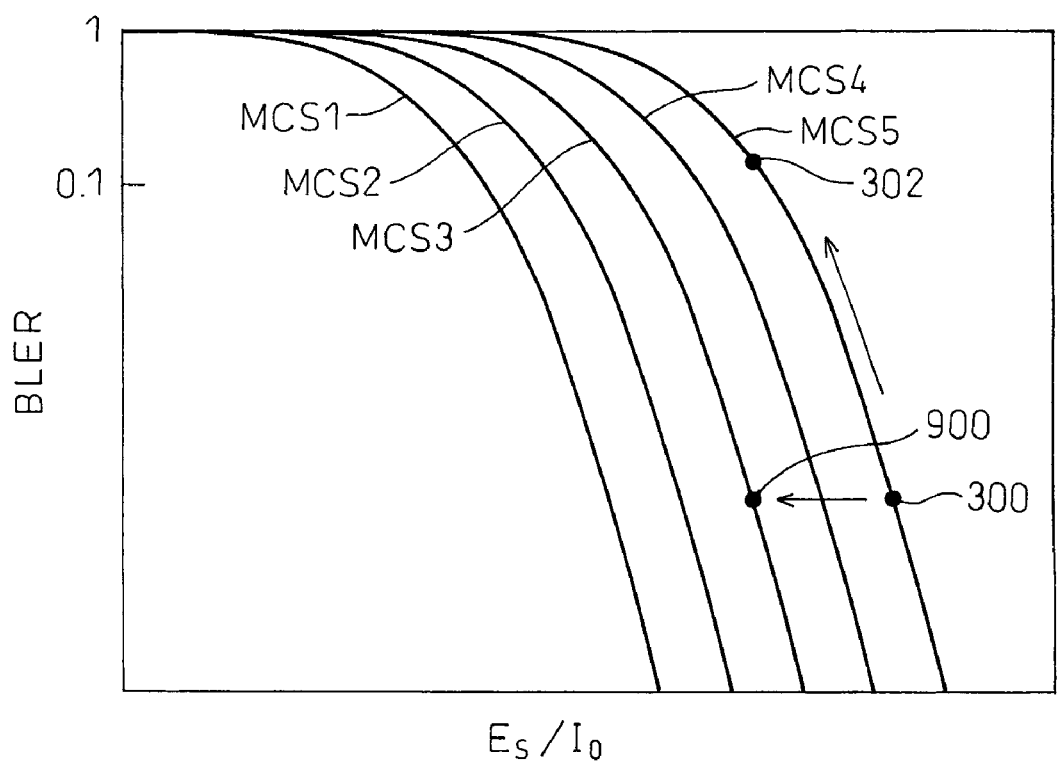
FIG. 9 is a diagram depicting the relationship between the block error rate BLER and the symbol power to interference power ratio $E_S/I_0$, with the modulation and coding scheme MCS as a parameter, and explaining the effect of the uplink transmit power control method according to the present invention.

FIG. 9 is a diagram similar to FIG. 3 and depicts the relationship between the block error rate BLER and the symbol power to interference power ratio $E_S/I_0$, with the modulation and coding scheme MCS as a parameter. According to the uplink transmit power control depicted in FIG. 2, the operating point changes from 300 to 302, and the error rate thus increases, as previously described. In contrast, according to the uplink transmit power control depicted in FIGS. 4 and 7, the operating point changes from 300 to 900, and thus the transmit power can be reduced without increasing the error rate.

As a result, the interfering wave from the terminal 420 to the base station B becomes weaker as indicated by arrow 424, while at the same time, the error rate is prevented from increasing for the transmission wave transmitted from the terminal 420 to the base station A as indicated by arrow 428.

According to the control depicted in FIG. 2, the transmit power of the terminal located near the boundary of the serving cell where the cell overlaps the cell of the neighboring base station is simply reduced without providing any protection measure, as a result, the possibility of the cell overlapping area being treated as being "out of range" increases. On the other hand, according to the control of the first embodiment described above, since a protection measure is taken to avoid such a risk by reducing the CQI, basically an "out of range" condition does not occur, as long as the terminal is located within the cell of the base station.

Figure 10:
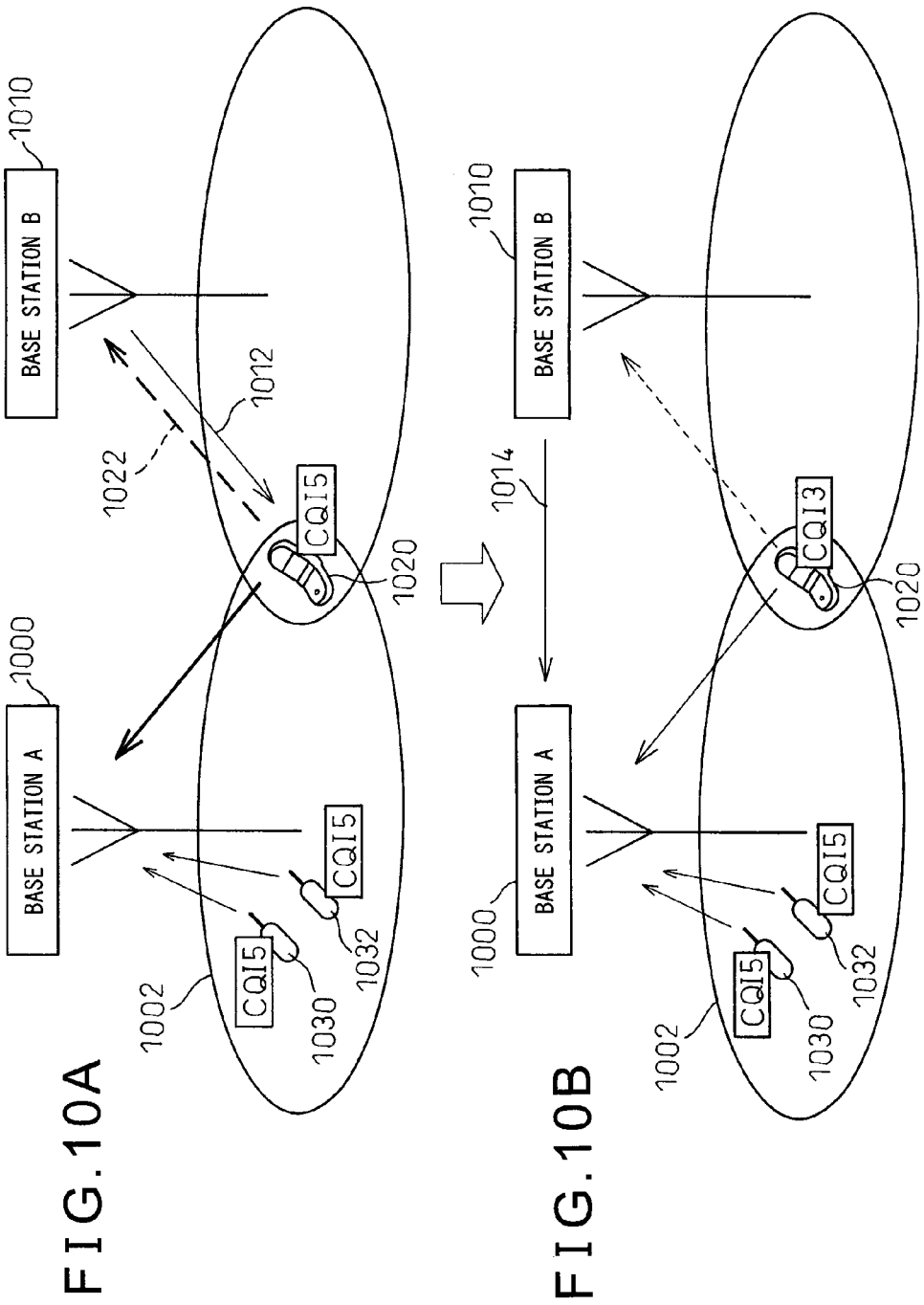
FIGS. 10A-10B are diagrams explaining a mobile communication system and an uplink transmit power control method according to a second embodiment of the present invention.
Figure 11:
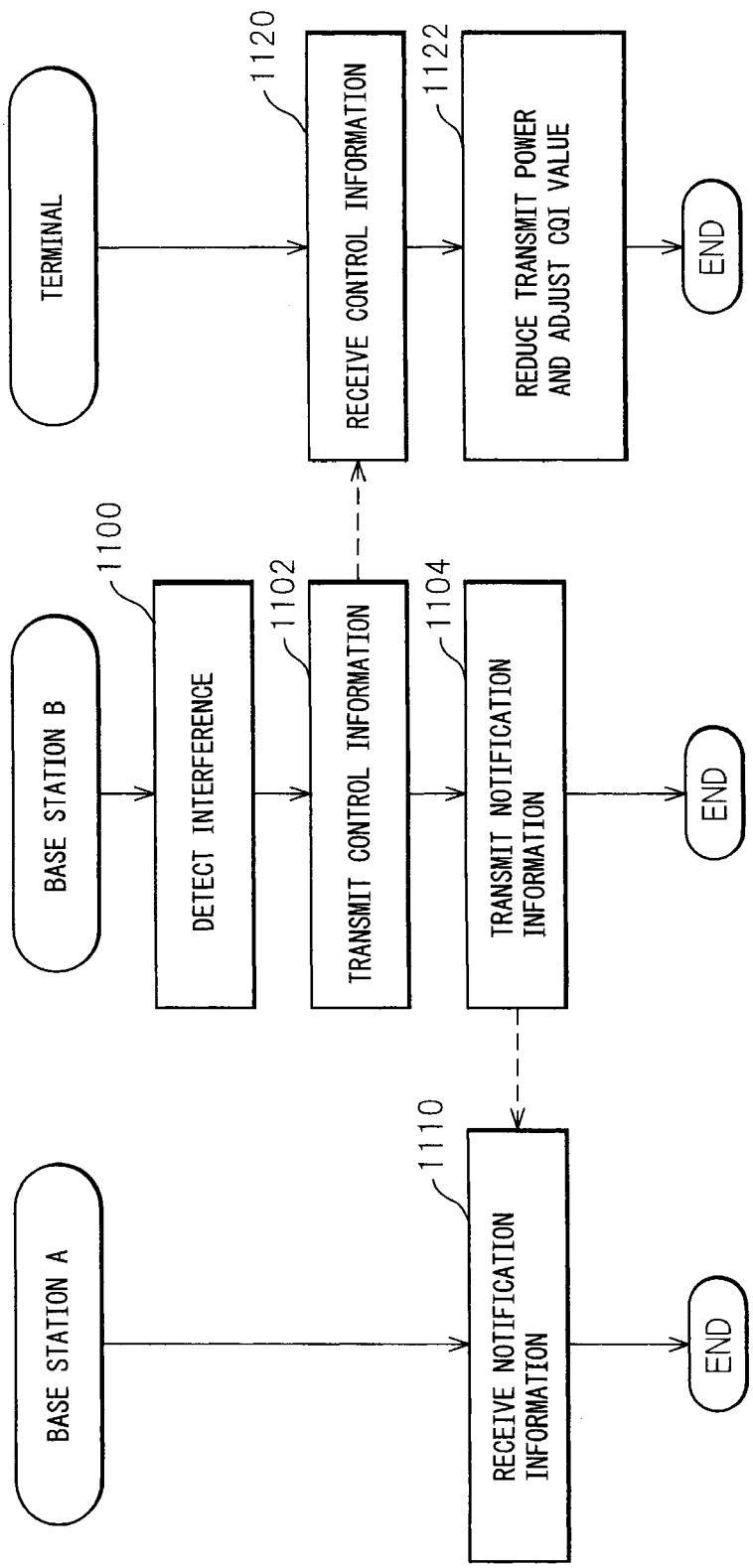
FIG. 11 is a sequence diagram illustrating the operation of base station A, base station B, and terminal according to the second embodiment.

FIG. 10 is a diagram for explaining a mobile communication system and an uplink transmit power control method according to a second embodiment of the present invention, and FIG. 11 is a sequence diagram illustrating the operation of the base station A, base station B, and terminal according to the second embodiment. In FIG. 10, reference numeral 1000 is the base station A, 1010 is the base station B, and 1020, 1030, and 1032 are mobile telephones as communication terminal units each constituting a mobile station unit.

In the foregoing first embodiment, the base station B that detected interference from a terminal sends a notification to the base station A serving the interfering terminal, and the base station A in response transmits control information to the interfering terminal, but in the second embodiment, the base station B that detected interference from a terminal directly transmits control information to the interfering terminal. In this case, if the signal transmitted from the terminal with reduced transmit power were received at the serving base station A without the latter knowing that the CQI value had been changed, an error condition would result due to a failure to recognize the previous CQI value; to avoid this, the base station B transmits notification information to all the neighboring base stations, including the base station A, to notify that the setting of the terminal has been changed.

First, as depicted in FIG. 10A, when the terminal 1020 located in the cell 1002 of the base station A moves to the boundary of the cell 1002 and begins to cause interference to the neighboring base station B as indicated by arrow 1022, the base station B detects the interference (step 1100). Next, the base station B transmits control information to the terminal 1020, as indicated by arrow 1012 in FIG. 10A (step 1102). This control information carries the interference flag and the interference level, as in the first embodiment.

The terminal 1020 receives the control information from the base station B (step 1120). From the interference flag, the terminal 1020 recognizes that it is causing interference, and reduces its transmit power in accordance with the interference level contained in the control signal, while at the same time, adjusting the CQI value in such a direction as to reduce the quality (step 1122). In the example depicted in FIGS. 10A and 10B, the terminal 1020 is controlled so as to reduce the CQI value from "5" to "3".

Further, as indicated by arrow 1014 in FIG. 10B, the base station B transmits notification information to all the neighboring base stations, including the base station A, to notify that the control information has been transmitted to the terminal 1020 (step 1104). The base station A that received the notification information recognizes that the CQI value of the terminal 1020 currently served by the base station A has been changed (step 1110). The second embodiment offers the same effect as that achieved in the first embodiment.

FIG. 12 is a diagram for explaining the control according to a third embodiment of the present invention that is performed after the operation of the first or second embodiment described above, and FIG. 13 is a sequence diagram illustrating the operation of the base station B according to the third embodiment. In FIG. 12, reference numeral 1200 is the base station A, 1210 is the base station B, and 1220 is a mobile telephone as a communication terminal unit constituting a mobile station unit.

In the third embodiment, after the terminal has been controlled to reduce its transmit power by responding to the detection of interference by the base station B, if the terminal further moves toward the base station B, and the interference from the terminal is again detected by the base station B, the base station B performs processing to place the terminal under the control of the base station B by switching the serving cell of the terminal.

Figure 12A:
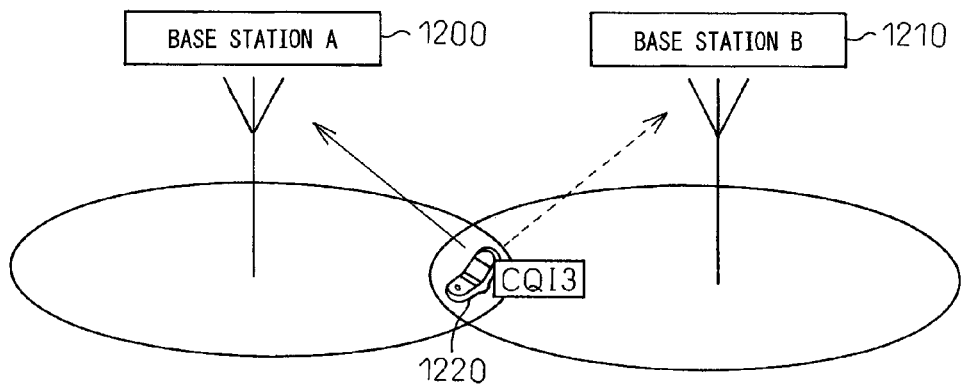
FIGS. 12A-12C are diagrams explaining the control according to a third embodiment of the present invention that is performed after the operation of the first or second embodiment.
Figure 12B:
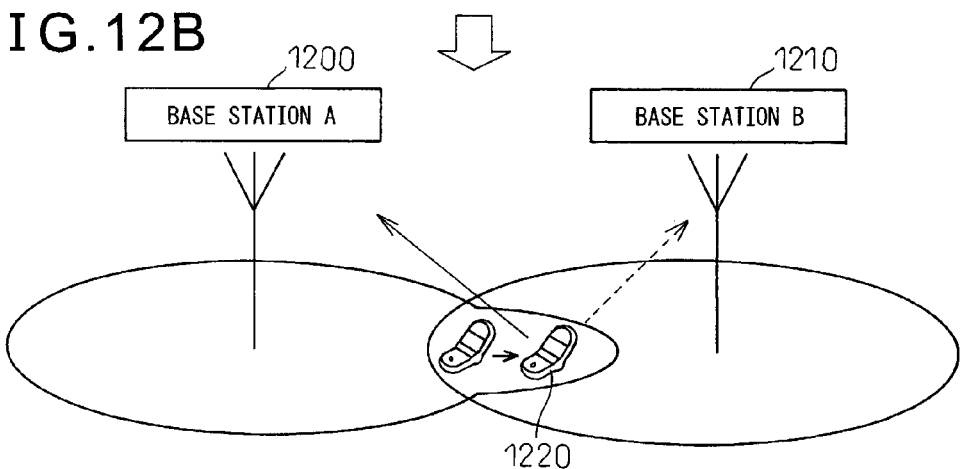
Figure 13:
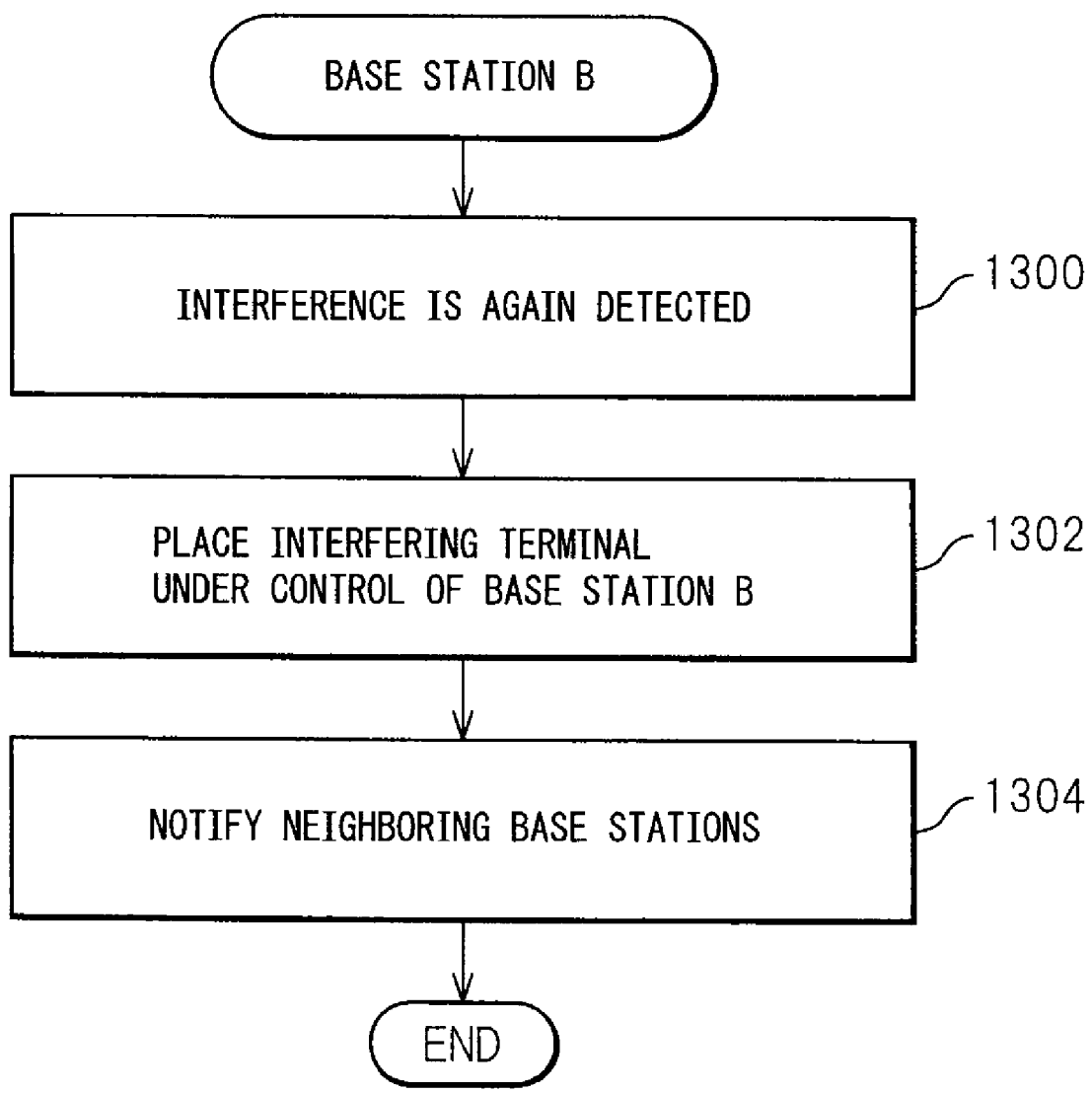
FIG. 13 is a sequence diagram illustrating the operation of the base station B according to the third embodiment.

First, suppose that the transmit power of the terminal 1220 has been reduced by responding to the detection of interference by the base station B, as depicted in FIG. 12A, i.e., the CQI value has been reduced to "3". From this condition, the terminal 1220 further moves toward the base station B, as depicted in FIG. 12B, and the interference from the terminal 1220 is again detected by the base station B (step 1300 in FIG. 13).

Figure 12C:
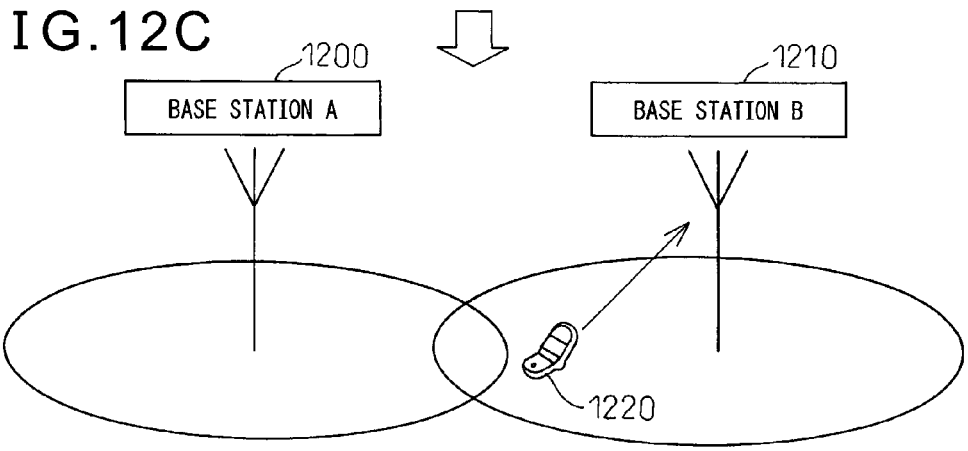

Since the interference from the terminal 1220 is again detected after the base station B has recorded the fact that the terminal 1220 reduced its transmit power by responding to the detection of interference by the base station B, i.e., since the terminal 1220 that has reduced its transmit power is again causing interference, the base station B recognizes that the terminal 1220 has definitely entered the cell served by the base station B. Then, as depicted in FIG. 12C, the base station B places the terminal 1220 under the control of the base station B (step 1302), and notifies all the neighboring base stations, including the base station A, that the terminal 1220 has been placed under the control of the base station B (step 1304).

In the conventional handover procedure, when the terminal moves out of the current cell, the connection with the current base station is cut off, a connection request is made to a new base station, and the terminal is placed under the control of the new base station; i.e., two steps of processing have to be performed from the time that the terminal moves to the boundary of the cell and the connection is cut off until the time that the terminal is placed under the control of the new base station. On the other hand, in the above third embodiment, when the terminal moves out and the connection with the current base station is cut off, the terminal is already placed under the control of the new base station.

What is claimed is:

1. An uplink transmit power control method for use in a mobile communication system in which a modulation and coding scheme is selected in accordance with reception quality information that a communication terminal unit as a mobile station unit periodically reports to a base station unit, the method comprising:

a first base station unit detecting an interference level and terminal identification information identifying a communication terminal unit that is causing interference greater than a predetermined reference value to said first base station unit;

said first base station unit transmitting, to said communication terminal unit, control information indicating said interference level and also indicating that said communication terminal unit is causing interference;

said communication terminal unit receiving said control information;

said communication terminal unit reducing transmit power in accordance with said interference level indicated by said control information, and adjusting reception quality information in such a direction as to reduce quality; and said first base station unit transmitting to all neighboring base stations notification information notifying that said control information has been transmitted to said communication terminal unit.

2. A mobile communication system in which a modulation and coding scheme is selected in accordance with reception quality information that a communication terminal unit as a mobile station unit periodically reports to a base station unit, wherein a first base station unit comprises:

a detecting unit to detect an interference level and terminal identification information identifying a communication terminal unit that is causing interference greater than a predetermined reference value to said first base station unit; and a transmitting unit to transmit, to said communication terminal unit, control information indicating said interference level and also indicating that said communication terminal unit is causing interference, and wherein said communication terminal unit comprises:

a receiving unit to receive said control information; and a reducing unit to reduce transmit power in accordance with said interference level indicated by said control information, and for adjusting reception quality information in such a direction as to reduce quality, and said first base station unit further comprises:

a transmitting unit to transmit to all neighboring base stations notification information notifying that said control information has been transmitted to said communication terminal unit.

3. A base station unit for use in a mobile communication system in which a modulation and coding scheme is selected in accordance with reception quality information that a communication terminal unit as a mobile station unit periodically reports to said base station unit, comprising:

a detecting unit to detect an interference level and terminal identification information identifying a communication terminal unit that is causing interference greater than a predetermined reference value to said base station unit;

a transmitting unit to transmit, to said communication terminal unit, control information indicating said interference level and also indicating that said communication terminal unit is causing interference; and a transmitting unit to transmit to all neighboring base stations notification information notifying that said control information has been transmitted to said communication terminal unit.

\* \* \* \* \*